United States Patent
Nagai et al.

(10) Patent No.: US 10,979,562 B2
(45) Date of Patent: Apr. 13, 2021

(54) CALL RECORDING SYSTEM, CALL RECORDING METHOD, AND CALL RECORDING PROGRAM

(71) Applicant: NEC Platforms, Ltd., Kawasaki (JP)

(72) Inventors: Kazuki Nagai, Kanagawa (JP); Yukie Katsuta, Kanagawa (JP)

(73) Assignee: NEC Platforms, Ltd., Kawasaki (JP)

( * ) Notice: Subject to any disclaimer, the term of this patent is extended or adjusted under 35 U.S.C. 154(b) by 0 days.

(21) Appl. No.: 16/338,149

(22) PCT Filed: Jun. 28, 2018

(86) PCT No.: PCT/JP2018/024555
§ 371 (c)(1),
(2) Date: Mar. 29, 2019

(87) PCT Pub. No.: WO2019/044147
PCT Pub. Date: Mar. 7, 2019

(65) Prior Publication Data
US 2019/0281156 A1    Sep. 12, 2019

(30) Foreign Application Priority Data
Sep. 4, 2017    (JP) .............................. JP2017-169659

(51) Int. Cl.
*H04W 28/06*    (2009.01)
*H04M 3/42*    (2006.01)
(Continued)

(52) U.S. Cl.
CPC .... *H04M 3/42221* (2013.01); *H04L 12/1831* (2013.01); *H04L 65/1069* (2013.01);
(Continued)

(58) Field of Classification Search
CPC ........... H04M 3/42221; H04M 3/2281; H04M 7/006; H04M 11/10; H04L 12/1831;
(Continued)

(56) References Cited

U.S. PATENT DOCUMENTS 6,295,340 B1 *  9/2001  Cannon ............... H04M 1/6505
                                                    379/88.1
7,738,638 B1    6/2010  Henderson
(Continued)

FOREIGN PATENT DOCUMENTS

| JP | 02-94756 A   | 4/1990 |
|----|--------------|--------|
| JP | 2000-106602 A| 4/2000 |

(Continued)

OTHER PUBLICATIONS

Communication dated Jul. 3, 2019 from European Patent Office in counterpart EP Application No. 19165792.3.
(Continued)

Primary Examiner — Md S Elahee
(74) Attorney, Agent, or Firm — Sughrue Mion, PLLC

(57) ABSTRACT

When a call session is set over an IP network between a calling IP phone and a called IP phone at the start of a call, information on the quality of communication between a host IP phone and a recording server is exchanged to compare the quality of communication of the two IP phones in each of the calling IP phone and the called IP phone. For example, the called IP phone, or a host IP phone, with a higher quality of communication than the calling IP phone of a conversing party transmits call audio data to the recording server as recording data. Meanwhile, the calling IP phone, or a host IP phone, with a lower quality of communication than the called IP phone of a conversing party refrains from transmitting the call audio data to the recording server.

20 Claims, 8 Drawing Sheets

(51) Int. Cl.
*H04L 29/06* (2006.01)
*H04M 3/22* (2006.01)
*H04M 7/00* (2006.01)
*H04M 11/10* (2006.01)
*H04L 12/18* (2006.01)

(52) U.S. Cl.
CPC .......... *H04L 65/1083* (2013.01); *H04L 65/80* (2013.01); *H04M 3/2281* (2013.01); *H04M 7/006* (2013.01); *H04M 11/10* (2013.01); *H04M 2203/301* (2013.01)

(58) Field of Classification Search
CPC . H04L 65/1069; H04L 65/1083; H04L 65/80; H04W 28/06
USPC .......... 379/67.1–76, 85, 88.02, 88.17, 88.22, 379/88.25, 88.26, 88.01; 709/206; 370/230.1
See application file for complete search history.

(56) References Cited

U.S. PATENT DOCUMENTS

| | | | | |
|---|---|---|---|---|
| 2010/0293240 A1* | 11/2010 | Lee | .................... | H04L 12/1827 709/206 |
| 2012/0274731 A1 | 11/2012 | Shanmukhadas et al. | | |
| 2014/0105016 A1* | 4/2014 | Tsuda | .................... | H04W 28/06 370/230.1 |
| 2015/0155001 A1 | 6/2015 | Kikugawa et al. | | |
| 2016/0269688 A1* | 9/2016 | Gardner | .......... | H04N 21/23116 |

FOREIGN PATENT DOCUMENTS

| | | |
|---|---|---|
| JP | 2000-307684 A | 11/2000 |
| JP | 2006-100999 A | 4/2006 |
| JP | 2008-060785 A | 3/2008 |
| JP | 2009-213018 A | 9/2009 |
| JP | 2015-106058 A | 6/2015 |
| JP | 2015-177411 A | 10/2015 |

OTHER PUBLICATIONS

Japanese Notice of Reason for Refusal issued in JP 2017-169659 dated Jul. 31, 2018.
International Search Report of PCT/JP2018/024555 dated Jul. 31, 2018.

* cited by examiner

CALL RECORDING SYSTEM, CALL RECORDING METHOD, AND CALL RECORDING PROGRAM

CROSS REFERENCE TO RELATED APPLICATIONS

This application is a National Stage of International Application No. PCT/JP2018/024555 filed Jun. 28, 2018, claiming priority based on Japanese Patent Application No. 2017-169659 filed Sep. 4, 2017, the entire disclosures of which are incorporated herein.

TECHNICAL FIELD

The present invention relates to call recording systems, call recording methods, and call recording programs in which call audio data is transmitted, over an IP network, from IP phones engaging in a voice call to a recording server as recording data so that the call audio data is recorded in the recording server.

BACKGROUND ART

In recent years, IP (Internet Protocol) phones that make or receive calls over an IP network are becoming widespread. Typically, in voice calls made or received with IP phones, signals are transmitted or received with the use of the SIP (Session Initiation Protocol) or the H.323 standard communication protocol. Upon a call session being established between two IP phones for engaging in a call with the use of the aforementioned communication protocol, call audio data is transmitted and received directly between the two IP phones with the use of media packets, such as audio packets, supported by a protocol such as the RTP (Real-Time Transport Protocol). Thus, a voice call is carried out.

Furthermore, in recent years, among users who use such IP phones, in particular, among businesses such as insurance companies and securities companies, with a purpose of handling complaints at call centers or the like, enhancing corporate compliance, or the like, there has been a high demand for a call recording system that can record the content of a call so that an exchange made during a call with a customer can be checked or troubles can be avoided. There is also a high demand that a recording device that records call audio data can store a large amount of data.

In view of the above situation, various call recording systems have been proposed. In one call recording system, a recording server having a large storage capacity is connected to an IP network, and a recording session is established between IP phones and the recording server. Thus, the content of media packets, such as audio packets, transmitted and received between the IP phones (call audio data) is transmitted to the recording server and recorded therein. An example is disclosed in Japanese Unexamined Patent Application Publication No. 2006-100999, or Patent Literature 1, titled "call recording system, call recording method, and computer program."

CITATION LIST

Patent Literature

Patent Literature 1: Japanese Unexamined Patent Application Publication No. 2006-100999

SUMMARY OF INVENTION

Technical Problem

However, current technology described in the aforementioned Patent Literature 1 and so on related to the present invention suffers from the following shortcomings.

Specifically, in a call recording system of current technology, when call audio data is transmitted from IP phones engaging in a call to a recording server as recording data and the call audio data is recorded, if both IP phones are configured to record a call, each of the IP phones transmits its transmitting call data and received call data to the recording server to have them stored in the recording server. When two IP phones, for example, an IP phone A and an IP phone B connected to an IP network engage in a call there between, the transmitted call data of one IP phone, for example, the IP phone A is the received call data of the other IP phone, for example, the IP phone B, and the received call data of one IP phone, for example, the IP phone A is the transmitted call data of the other IP phone, for example, the IP phone B. Consequently, if the IP phone A and the IP phone B are both configured to record a call, the same call audio data is transmitted to the recording server from the IP phone A and the IP phone B configured to record the call (although there is a difference in that one is the transmitted call data and the other is the received call data, the two pieces of data are the same data when they are switched).

FIG. 8 is a schematic diagram for describing a state in which the same call audio data is recorded in duplicate in a recording server according to current technology. As illustrated in FIG. 8, when an IP phone A and an IP phone B are engaging in a call, the recording server records, as recording data of the IP phone A, both transmitted call data a transmitted by the IP phone A and received call data b received from the IP phone B of a conversing party. In addition, the recording server records, as recording data of the IP phone B, both transmitted call data b transmitted by the IP phone B and received call data a received from the IP phone A of a conversing party. In this case, the transmitted call data a, in the recording data of the IP phone A, transmitted by the IP phone A is the same data as the received call data a, in the recording data of the IP phone B, received from the IP phone A of the conversing party. In a similar manner, the transmitted call data b, in the recording data of the IP phone B, transmitted by the IP phone B is the same data as the received call data b, in the recording data of the IP phone A, received from the IP phone B of the conversing party.

Accordingly, the same call audio data is transmitted over the IP network in duplicate as the recording data to the recording server from the two IP phones engaging in the call. Thus, the same call audio data is recorded in duplicate in the recording server, which leads to a problem in that the storage area of the recording server is wasted. Furthermore, there is another problem in that the traffic over the IP network increases twofold to no purpose.

(Aim of the Present Invention)

The present invention has been made in view of the above problems and is directed to providing a call recording system, a call recording method, and a call recording system that, in a system in which call audio data is transmitted from IP phones engaging in a call to a recording server over an IP network to record the call, keep the storage area on the recording server from being wasted and keep the traffic over the IP network from increasing to no purpose.

Solution to Problem

To solve the issues described above, a call recording system, a call recording method, and a call recording program according to the present invention mainly employ configurations with the following features.

(1) A call recording system according to the present invention is a call recording system configured to transmit, over an IP network, call audio data from IP phones engaging in a voice call to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

(2) A call recording system according to the present invention is a call recording system configured to transmit, over an IP network, call audio data from IP phones engaging in a voice call to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter.

(3) A call recording system according to the present invention is a call recording system configured to transmit, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, and if the recording data is already stored, the recording server associates the phone information included in the recording data received from the IP phone with the stored recording data and then discards the recording data received from the IP phone.

(4) A call recording method according to the present invention is a call recording method of transmitting, over an IP network, call audio data from IP phones engaging in a voice call to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

(5) A call recording method according to the present invention is a call recording method of transmitting, over an IP network, call audio data from IP phones engaging in a voice call to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter.

(6) A call recording method according to the present invention is a call recording method of transmitting, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, and if the recording data is already stored, the recording server associates the phone information included in the recording data received from the IP phone with the stored recording data and then discards the recording data received from the IP phone.

(7) A call recording program according to the present invention is a call recording program that can cause a computer provided in IP phones engaging in a voice call to execute an operation of transmitting, over an IP network, call audio data from the IP phones to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

Advantageous Effects of Invention

A call recording system, a call recording method, and a call recording program according to the present invention can provide the following advantageous effects.

Specifically, the present invention provides a mechanism in which when a call session is established between two IP phones that engage in a call, the two IP phones exchange information on the quality of communication between the two IP phones and a recording server and thus it is determined whether each of the two IP phones can transmit (or is to refrain from transmitting) call audio data to the recording server. Accordingly, the call audio data can be kept from being transmitted in duplicate to the recording server. Thus, the communication traffic in an IP network constituting a call recording system can be reduced, and the storage capacity of the recording server can be prevented from being wasted.

In addition, the present invention provides a mechanism in which it is determined whether two IP phones can transmit (or are to refrain from transmitting) call audio data to a recording server in accordance with which one of the two IP phones engaging in a call has transmitted a request earlier for establishing a recording session with the recording server. Accordingly, the call audio data can be kept from being transmitted in duplicate to the recording server. Thus, the communication traffic in an IP network constituting a call recording system can be reduced, and the storage capacity of the recording server can be prevented from being wasted.

DESCRIPTION OF EMBODIMENTS

Figure 1:
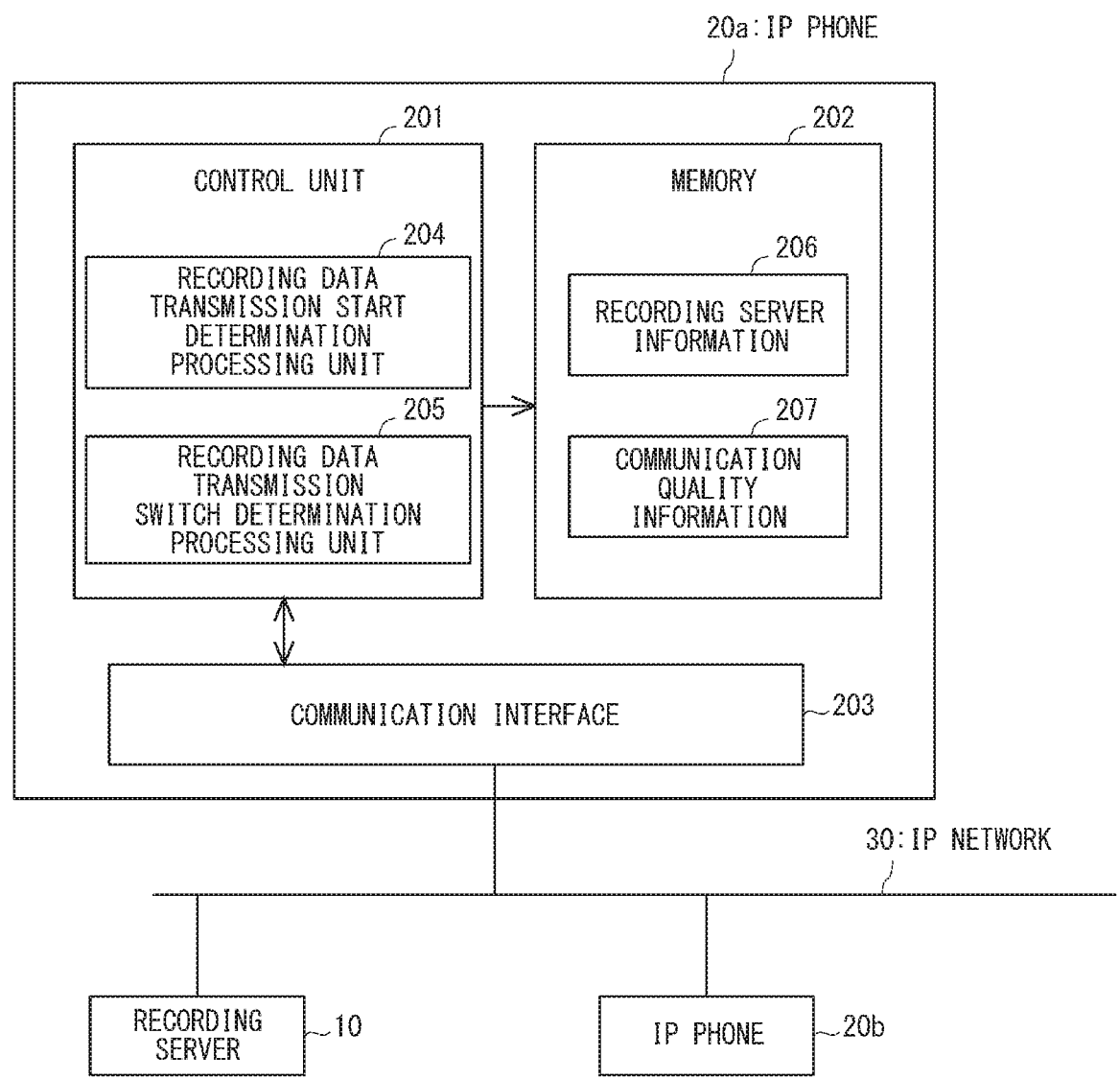
FIG. 1 is a system configuration diagram illustrating a system configuration example of a call recording system according to an embodiment of the present invention.

Hereinafter, preferred embodiments of a call recording system, a call recording method, and a call recording program according to the present invention will be described with reference to the appended drawings. In the following description, a call recording system and a call recording method according to the present invention will be described mainly. It is needless to say, however, that the call recording method may be implemented as a call recording program that can be executed by a computer or that a call recording program may be recorded on a computer-readable recording medium. In addition, it is needless to say that the reference characters indicated in the following drawings are given to the elements as examples in order to facilitate understanding and are not intended to limit the present invention to the illustrated embodiments.

(Features of the Present Invention)

Prior to describing embodiments of the present invention, an overview of features of the present invention will be described. The present invention relates to a call recording system, a call recording method, and a call recording program in which call audio data is transmitted from IP phones engaging in a call to a recording server disposed on an IP network for recording the call.

Primary features are as follows.

When two IP phones each configured to record a call engage in a call, (1) the two IP phones exchange information in advance; thus, one IP phone with a higher communication quality is selected from the two IP phones, and call audio data is transmitted from the selected IP phone to the recording server as recording data so that the call audio data is recorded in the recording server, or (2) one IP phone that has transmitted a recording request earlier to the recording server is selected from the two IP phones, and call audio data is transmitted from the selected IP phone to the recording server as recording data so that the call audio data is recorded in the recording server.

This can provide the following advantageous effects. Specifically, even when two IP phones each configured to record a call engage in a call, the storage area in the recording server is not wasted, and the traffic on the IP network can be prevented from increasing to no purpose.

(Configuration Examples of Embodiments)

First, a system configuration example of a call recording system according to an embodiment of the present invention will be described with reference to FIG. 1. FIG. 1 is a system configuration diagram illustrating a system configuration example of a call recording system according to an embodiment of the present invention. In the call recording system illustrated as an example in FIG. 1, when two IP phones each configured to make a recording engage in a call, call audio data for recording is transmitted to a recording server from one IP phone with a higher recording quality (the quality of communication with the recording server). Thus, the recording data is kept from being transmitted in duplicate. This makes it possible to reduce the communication traffic, to keep the storage capacity of the recording server from being wasted, and to record high-quantity call audio data.

The call recording system illustrated in FIG. 1 employs the VoIP (Voice over IP) technology and is configured to transmit and receive call audio data over an IP network 30. The call recording system includes a recording server 10, an IP phone 20a, IP phone 20b, and so on that are connected to the IP network 30. In FIG. 1, an inner configuration example of only the IP phone 20a among the IP phone 20a, the IP phone 20b, and so on that each make a voice call is illustrated. The IP phone 20a, the IP phone 20b, and so on have the same inner configuration.

Specifically, the IP phone 20a, the IP phone 20b, and so on each include at least a control unit 201, a memory 202, and a communication interface 203. The memory 202 and the communication interface 203 are controlled by the control unit 201. The control unit 201 includes at least a recording data transmission start determination processing unit 204 and a recording data transmission switch determination processing unit 205. The memory 202 stores at least recording server information 206 and communication quality information 207. The recording server information 206 includes at least address information and route information on the recording server 10. The communication quality information 207 indicates the quality of communication with the recording server 10 (i.e., the reception quality of the recording data received by the recording server 10). In the following description, an assumption is that the IP phone 20a, the IP phone 20b, and so on are each configured to record a call by default and that call audio data is specified to be recorded in the recording server 10.

When the IP phones configured to record a call—for example, the IP phone 20a and the IP phone 20b, engage in a voice call, the recording data transmission start determination processing unit 204 of the control unit 201 has a function of exchanging the recording server information 206 and the communication quality information 207 stored in the respective memories 202 of the IP phones of conversing parties—for example, the IP phone 20a and the IP phone 20b—between these IP phones. This exchange is carried out when call session establishing processing is carried out at the start of a voice call between the IP phone 20a and the IP phone 20b.

The recording data transmission start determination processing unit 204 also has a function of comparing the recording server information 206 and the communication quality information 207 of the host IP phone with the recording server information 206 and the communication quality information 207 of the other party's IP phone and determining, on the basis of a determination result, whether the host IP phone should transmit the call audio data for recording to the recording server 10 or the other party's IP phone should transmit the call audio data for recording to the recording server 10.

The recording data transmission start determination processing unit 204 further has a function of establishing a recording session with the recording server 10 and transmitting, to the recording server 10, the call audio data transmitted and received in a call session as recording data if the recording data transmission start determination processing unit 204 has determined that the host IP phone should transmit the call audio data for recording to the recording server 10. Furthermore, the recording data transmission start determination processing unit 204 has a function of storing, into the communication quality information 207 in the memory 202, information on the reception quality sent, as appropriate, from the recording server 10 that has received the transmitted call audio data (recording data) as information indicating the quality of communication with the recording server 10.

The recording data transmission switch determination processing unit 205 of the control unit 201 has a function of exchanging the communication quality stored as the latest information in the communication quality information 207 in the memory 202 between the two IP phones engaging in the voice call—for example, between the IP phone 20a and the IP phone 20b. This exchange is carried out while the IP phones configured to record a call—for example, the IP phone 20a and the IP phone 20b—are engaging in a voice call and either one of the IP phones determined by the recording data transmission start determination processing unit 204 is transmitting the recording data (call audio data) to the recording server 10.

The recording data transmission switch determination processing unit 205 also has a function of comparing the communication quality of the host IP phone with the communication quality of the other party's IP phone and determining, on the basis of a comparison result, whether to switch the IP phone that transmits the call audio data for recording to the recording server 10 as the recording data.

The recording data transmission switch determination processing unit 205 further has a function of, if the recording data transmission switch determination processing unit 205 has determined that the IP phone that transmits the call audio data for recording to the recording server 10 should be switched, stopping the transmission operation if the host IP phone has been transmitting the call audio data to the recording server 10 or switching to an operation of transmitting the call audio data for recording to the recording server 10 if the host IP phone has not been transmitting the call audio data to the recording server 10.

Description of Operation of Embodiments

Next, an example of an operation of the call recording system illustrated in FIG. 1 will be described in detail with reference to the drawings. Described below as an example is a case in which the IP phone 20a illustrated in FIG. 1 calls the IP phone 20b and a voice call is carried out between the IP phone 20a and the IP phone 20b. In other words, the IP phone 20a is a calling IP phone 20a, and the IP phone 20b is a called IP phone 20b. The assumption is that the IP phone 20a and the IP phone 20b are both configured to record a call by default.

Figure 2:
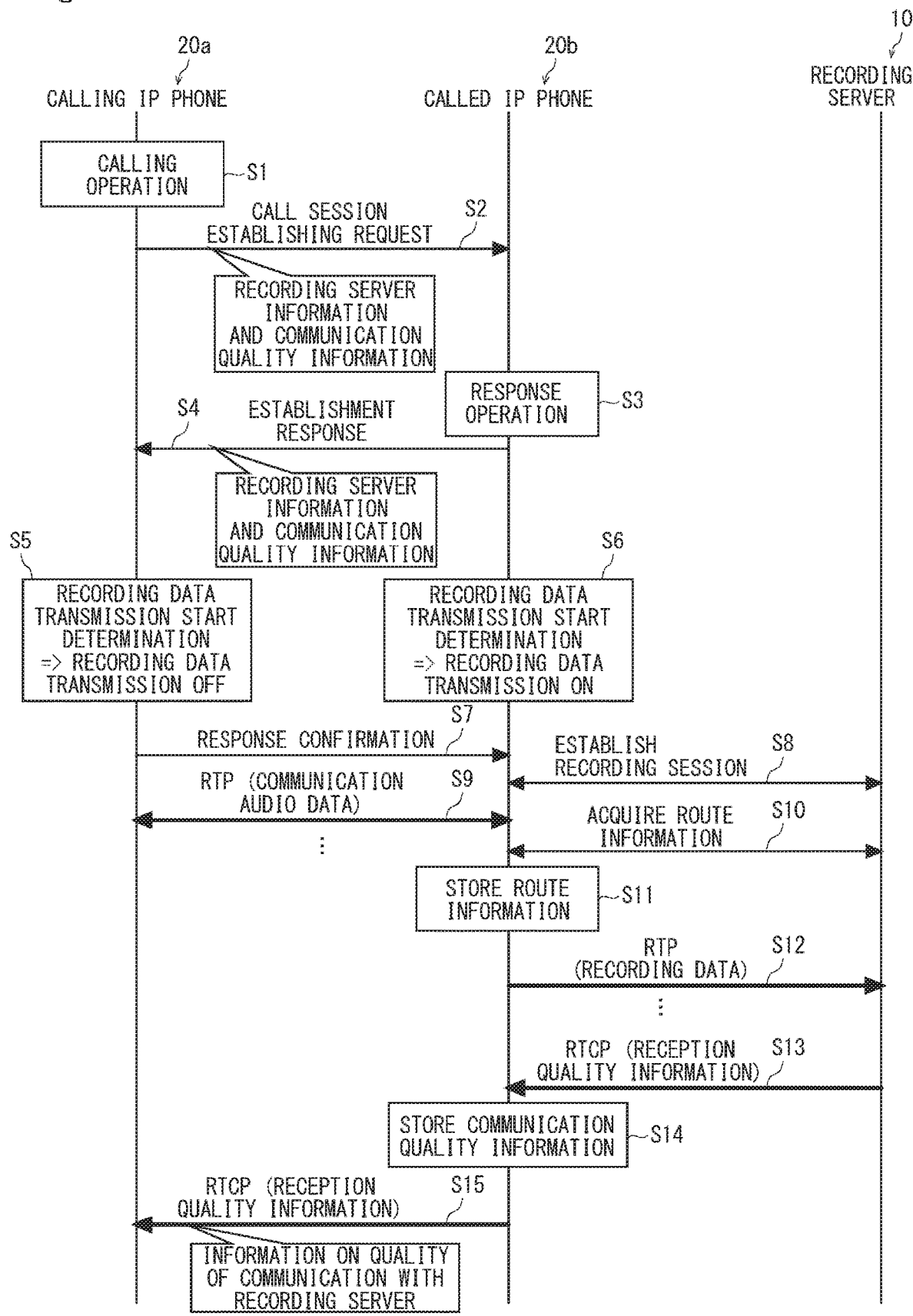
FIG. 2 is a sequence diagram for describing an example of an operation for making a recording data transmission start determination when a call starts being recorded in the call recording system illustrated in FIG. 1.

First, an example of an operation carried out in each of the calling IP phone 20a and the called IP phone 20b to determine whether to start transmitting recording data when a call starts being recorded will be described with reference to a sequence chart illustrated in FIG. 2. FIG. 2 is a sequence diagram for describing an example of an operation for making a recording data transmission start determination when a call starts being recorded in the call recording system illustrated in FIG. 1. FIG. 2 illustrates an example of a flow of signals transmitted and received among the calling IP phone 20a, the called IP phone 20b, and the recording server 10.

In the sequence chart illustrated in FIG. 2, first, a user operates the calling IP phone 20a to call the called IP phone 20b (step S1). Then, the recording data transmission start determination processing unit 204 of the control unit 201 of the calling IP phone 20a is started and sends a call session establishing request message (step S2) to the called IP phone 20b of the conversing party. The call session establishing request message includes the recording server information 206 and the communication quality information 207 stored in the memory 202 of the calling IP phone 20a. A user of the called IP phone 20b that has received the call session establishing request message from the calling IP phone 20a carries out a response operation (step S3). Then, the recording data transmission start determination processing unit 204 is started similarly in the called IP phone 20b and returns an establishment response message to the calling IP phone 20a (step S4). The establishment response message includes the recording server information 206 and the communication quality information 207 stored in the memory 202 of the called IP phone 20b.

Upon receiving the establishment response message, the calling IP phone 20a determines whether the recording data (call audio data) can start being transmitted to the recording server 10 on the basis of a result of comparing the recording server information 206 and the communication quality information 207 of the called IP phone 20b included in the received establishment response message with the recording server information 206 and the communication quality information 207 of the calling IP phone 20a stored in the memory 202 of the calling IP phone 20a (step S5). In a similar manner, upon receiving the aforementioned call session establishing request message, the called IP phone 20b determines whether the recording data (call audio data) can start being transmitted to the recording server 10 on the basis of a result of comparing the recording server information 206 and the communication quality information 207 of the calling IP phone 20a included in the call session establishing request message with the recording server information 206 and the communication quality information 207 of the called IP phone 20b stored in the memory 202 of the called IP phone 20b (step S6).

Figure 3:
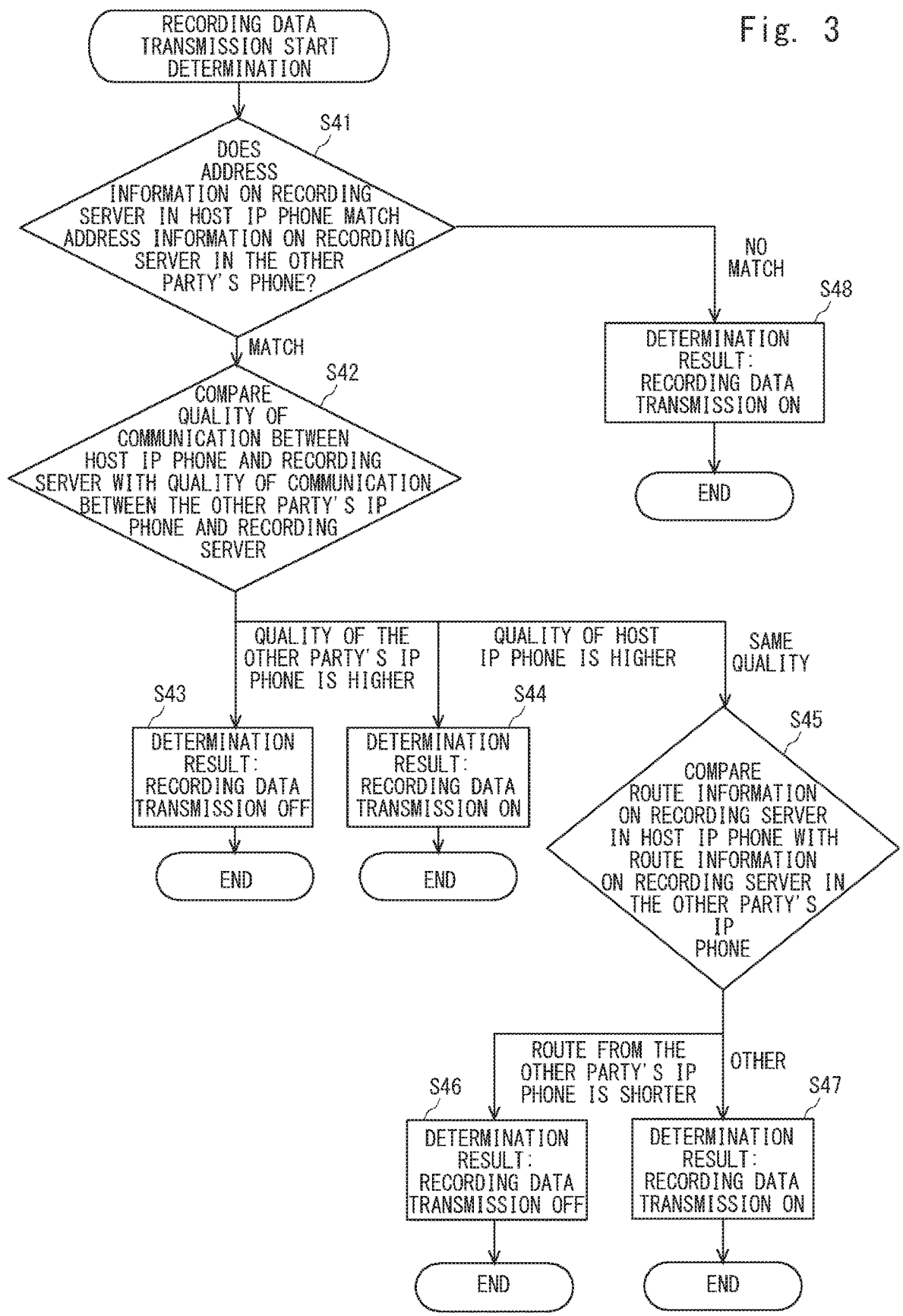
FIG. 3 is a flowchart for describing an example of processing of determining whether recording data (call audio data) can start being transmitted to a recording server, and the processing is carried out in call session establishing processing that is carried out when a voice call is started in each of a calling IP phone and a called IP phone.

Now, details of processing of determining whether the recording data (call audio data) can start being transmitted to the recording server 10 on the basis of the result of comparing the recording server information 206 and the communication quality information 207 of the calling IP phone 20a with the recording server information 206 and the communication quality information 207 of the called IP phone 20b will be described with reference to the flowchart illustrated in FIG. 3. This processing is carried out in the call session establishing processing carried out when a voice call is started in each of the calling IP phone 20a and the called IP phone 20b. FIG. 3 is a flowchart for describing an example of processing of determining whether the recording data (call audio data) can start being transmitted to the recording server 10, and this processing is carried out in the call session establishing processing carried out when a voice call is started in each of the calling IP phone 20a and the called IP phone 20b.

In the flowchart illustrated in FIG. 3, first, it is determined whether the address, or the IP address, of the recording server 10 included in the recording server information 206 of the host IP phone matches the address, or the IP address, of the recording server 10 included in the recording server information 206 of the other party's IP phone (step S41). If the addresses do not match ("NO MATCH" in step S41), as a determination result, a transmission operation flag instructing the host IP phone to transmit the recording data (call audio data) to the recording server 10 is set to ON (step S48).

Meanwhile, if the IP addresses of the recording server 10 in the two IP phones match ("MATCH" in step S41), the quality of communication between the host IP phone and the recording server 10 is compared with the quality of communication between the other party's IP phone and the recording server 10 on the basis of the communication quality information 207 of the host IP phone and the communication quality information 207 of the other party's IP phone (step S42). If it is determined, as a comparison result, that the quality of communication between the other party's IP phone and the recording server 10 is higher than the quality of communication between the host IP phone and the recording server 10 (i.e., the quality of communication of the host IP phone is lower) ("QUALITY OF THE OTHER PARTY'S IP PHONE IS HIGHER" in step S42), as a determination result, the transmission operation flag instructing the host IP phone to transmit the recording data (call audio data) to the recording server 10 is set to OFF to enter a state in which the transmission operation is paused (step S43).

If it is determined, as a determination result in step S42, that the quality of communication between the host IP phone and the recording server 10 is higher than the quality of communication between the other party's IP phone and the recording server 10 (i.e., the quality of communication of the host IP phone is higher) ("QUALITY OF HOST IP PHONE IS HIGHER" in step S42), as a determination result, the transmission operation flag instructing the host IP phone to transmit the recording data (call audio data) to the recording server 10 is set to ON to enter a state in which the transmission operation is permitted (step S44).

If it is determined, as a determination result in step S42, that the quality of communication between the host IP phone and the recording server 10 is substantially the same as the quality of communication between the other party's IP phone and the recording server 10 ("SAME QUALITY" in step S42), route information between the host IP phone and the recording server 10 is compared with route information between the other party's IP phone and the recording server 10 on the basis of the route information to the recording server 10 included in the recording server information of the host IP phone and the route information to the recording server included in the recording server information of the other party's IP phone (step S45).

If it is determined, as a comparison result in step S45, that the route between the other party's IP phone and the recording server 10 is shorter than the route between the host IP phone and the recording server 10 ("ROUTE FROM THE OTHER PARTY'S IP PHONE IS SHORTER" in step S45), as a determination result, the transmission operation flag instructing the host IP phone to transmit the recording data (call audio data) to the recording server 10 is set to OFF (step S46). Meanwhile, if it is determined that the route between the host IP phone and the recording server 10 is shorter than or substantially equal to the route between the other party's IP phone and the recording server 10 ("OTHER" in step S45), as a determination result, the transmission operation flag instructing the host IP phone to transmit the recording data (call audio data) to the recording server 10 is set to ON (step S46).

When the transmission operation flag instructing the host IP phone to transmit the recording data (call audio data) to the recording server 10 is set to ON, this means that the host IP phone can start transmitting the recording data (call audio data) to the recording server 10. When the transmission operation flag instructing the host IP phone to transmit the recording data (call audio data) to the recording server 10 is set to OFF, this means that the host IP phone is not allowed to start transmitting the recording data (call audio data) to the recording server 10.

Returning to the description of step S5 and step S6 in the sequence diagram illustrated in FIG. 2, the assumption is as follows. As a determination result on whether the recording data (call audio data) can start being transmitted to the recording server 10, for example, the transmission operation flag instructing the calling IP phone 20*a* to transmit the recording data (call audio data) to the recording server 10 is set to OFF in step S5, and the transmission operation flag instructing the called IP phone 20*b* to transmit the recording data (call audio data) to the recording server 10 is set to ON in step S6.

Thereafter, the IP phone in which the transmission operation flag is set to OFF, or the calling IP phone 20*a*, stops transmitting the recording data (call audio data) to the recording server 10. Since the calling IP phone 20*a* has received the establishment response message from the called IP phone 20*b*, the calling IP phone 20*a* returns, to the called IP phone 20*b*, a response confirmation message indicating confirmation for the received establishment response message (step S7). The response confirmation message may include information indicating whether the transmission operation flag is ON or OFF in the transmitting host IP phone (in the present embodiment, information indicating OFF in the calling IP phone 20*a* as set in step S5).

The called IP phone 20*b* in which the transmission operation flag has been set to ON establishes a recording session between the called IP phone 20*b* and the recording server 10, upon receiving the response confirmation message from the calling IP phone 20*a* (step S8). Thereafter, in the call session established between the calling IP phone 20*a* and the called IP phone 20*b*, the call audio data starts being transmitted and received therebetween in accordance with a protocol such as the RTP (Real-Time Transport Protocol) (step S9). Furthermore, the called IP phone 20*b* starts transmitting, to the recording server 10, the call audio data (transmitted call data and received call data) in the called IP phone 20*b* transmitted to and received from the calling IP phone 20*a*, and the called IP phone 20*b* transmits the stated call audio data as the recording data via the recording session established between the called IP phone 20*b* and the recording server 10.

Furthermore, if the called IP phone 20*b* has established a recording session between the called IP phone 20*b* and the recording server 10, the called IP phone 20*b*, for example, acquires the route information to the recording server 10 from the called IP phone 20*b* by using, as appropriate, a traceroute command or the like (step S10) and stores the route information as one piece of the recording server information 206 in the memory 202 (step S11). In addition, the called IP phone 20*b* starts transmitting, to the recording server 10, the call audio data in the called IP phone 20*b* transmitted to and received from the calling IP phone 20*a* in accordance with a protocol such as the RTP. The called IP phone 20*b* transmits the stated call audio data as the recording data via the recording session established between the called IP phone 20*b* and the recording server 10 (step S12).

Furthermore, as long as the recording session is being established between the called IP phone 20*b* and the recording server 10, the called IP phone 20*b* receives reception quality information sent from the recording server 10 in accordance with the RTCP (RTP Control Protocol) protocol in order to check the communication status between the called IP phone 20*b* and the recording server 10 (step S13). The called IP phone 20*b* stores the received reception quality information into the communication quality information 207 in the memory 202 as information indicating the quality of communication between the called IP phone 20*b* and the recording server 10 (step S14). Thereafter, the called IP phone 20*b* sends, to the calling IP phone 20*a*, the reception quality information sent from the recording server 10 as information indicating the quality of communication between the called IP phone 20*b* and the recording server 10 in accordance with the RTCP protocol (step S15).

As described thus far, when two IP phones configured to make a recording—for example, the calling IP phone 20*a* and the called IP phone 20*b*—engage in a call, the IP phone with a higher quality of communication with the recording server 10 (e.g., the called IP phone 20*b* in the above description) transmits the call audio data to the recording server 10, and this call audio data is stored in the recording server 10. The IP phone with a lower quality of communication with the recording server 10 (e.g., the calling IP phone 20*a* in the above description) is kept from establishing a recording session and refrains from transmitting the call audio data to the recording server 10.

This can provide the following advantageous effects. Specifically, even when two IP phones each configured to record a call engage in a call, the storage area in the recording server 10 is not wasted, and the traffic on the IP network 30 is kept from increasing to no purpose.

Figure 4:
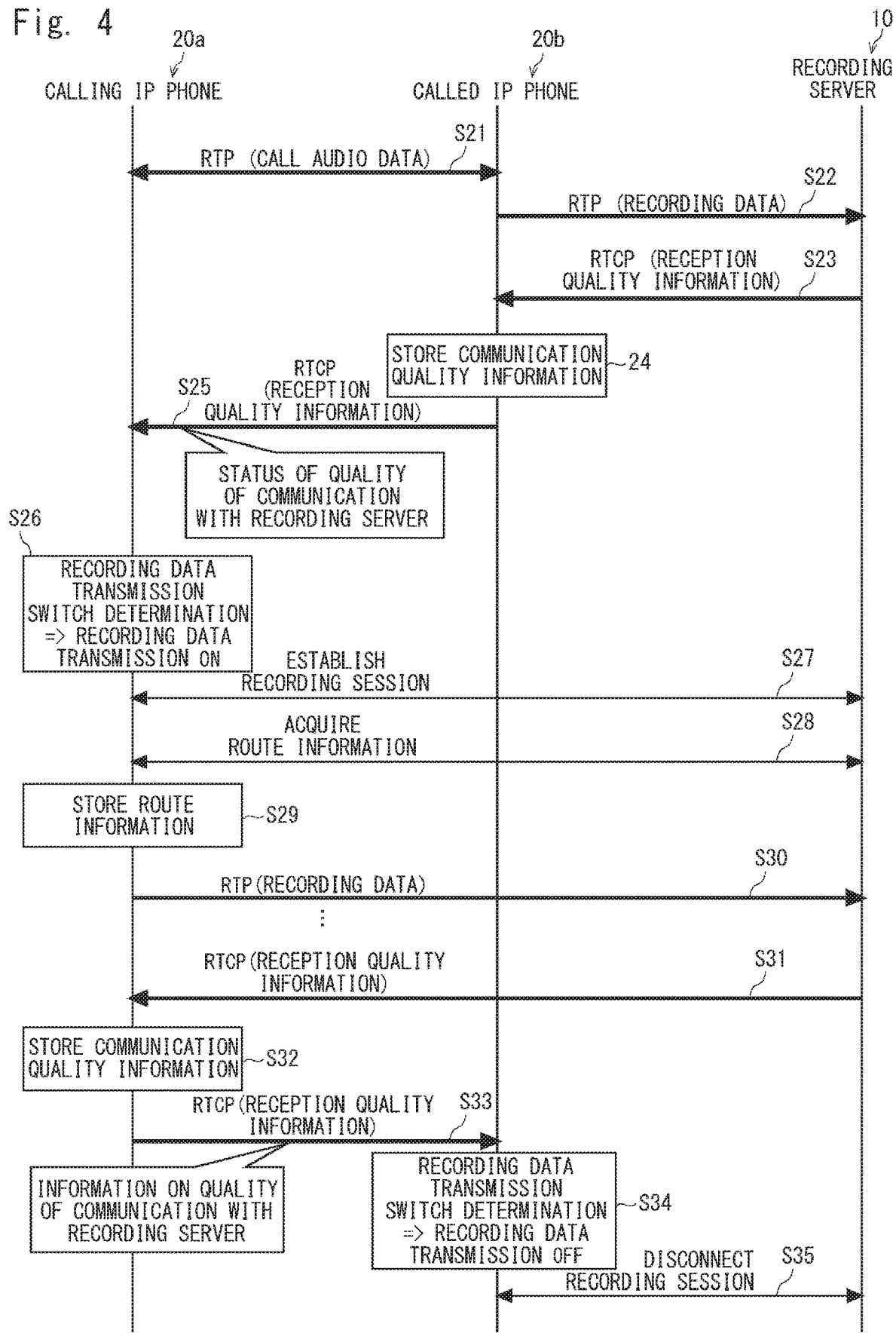
FIG. 4 is a sequence diagram for describing an example of an operation for making a recording data transmission switch determination during call recording in the call recording system illustrated in FIG. 1.

Next, an example of an operation carried out in a recording data transmission switch determination of determining whether to switch the IP phone that transmits the recording data to the recording server 10 during call recording will be described with reference to the sequence chart illustrated in FIG. 4. FIG. 4 is a sequence diagram for describing an example of an operation for making a recording data transmission switch determination during call recording in the call recording system illustrated in FIG. 1. FIG. 4 illustrates an example of a flow of signals transmitted and received among the calling IP phone 20*a*, the called IP phone 20*b*, and the recording server 10. In the example illustrated in the sequence chart in FIG. 4, between the calling IP phone 20*a* and the called IP phone 20*b*, the IP phone that transmits the recording data (call audio data) to the recording server 10 is switched from the current called IP phone 20*b* to the calling IP phone 20*a*.

In the sequence chart illustrated in FIG. 4, first, the call audio data is transmitted and received between the calling IP phone 20*a* and the called IP phone 20*b* in accordance with a protocol such as the RTP (step S21). Then, the called IP phone 20*b* that has established a recording session between the called IP phone 20*b* and the recording server 10 transmits, to the recording server 10, the call audio data transmitted and received between the called IP phone 20*b* and the calling IP phone 20*a* in accordance with a protocol such as the RTP as the recording data, continuing from the sequence illustrated in FIG. 2 (step S22).

As long as the recording session is being established between the called IP phone 20*b* and the recording server 10, the called IP phone 20*b* receives the reception quality information sent, as appropriate, from the recording server 10 in accordance with the RTCP protocol in order to check the communication status between the called IP phone 20*b* and the recording server 10 (step S23) and continues to store the received reception quality information into the communication quality information 207 in the memory 202 as information indicating the quality of communication between the called IP phone 20*b* and the recording server 10 (step S24). The calling IP phone 20*a* also continues to send, to the calling IP phone 20*a*, the reception quality information sent from the recording server 10 as information indicating the quality of communication between the called IP phone 20*b* and the recording server 10 in accordance with the RTCP protocol (step S25).

Upon receiving the information on the quality of communication between the called IP phone 20*b* and the recording server 10 from the called IP phone 20*b*, the calling IP phone 20*a* determines whether the calling IP phone 20*a* is the IP phone that should transmit the recording data (call audio data) to the recording server 10 in place of the called IP phone 20*b* of the conversing party on the basis of the communication quality information 207 indicating the quality of communication between the calling IP phone 20*a* and the recording server 10 and the received information on the quality of communication between the called IP phone 20*b* and the recording server 10 (step S26).

Figure 5:
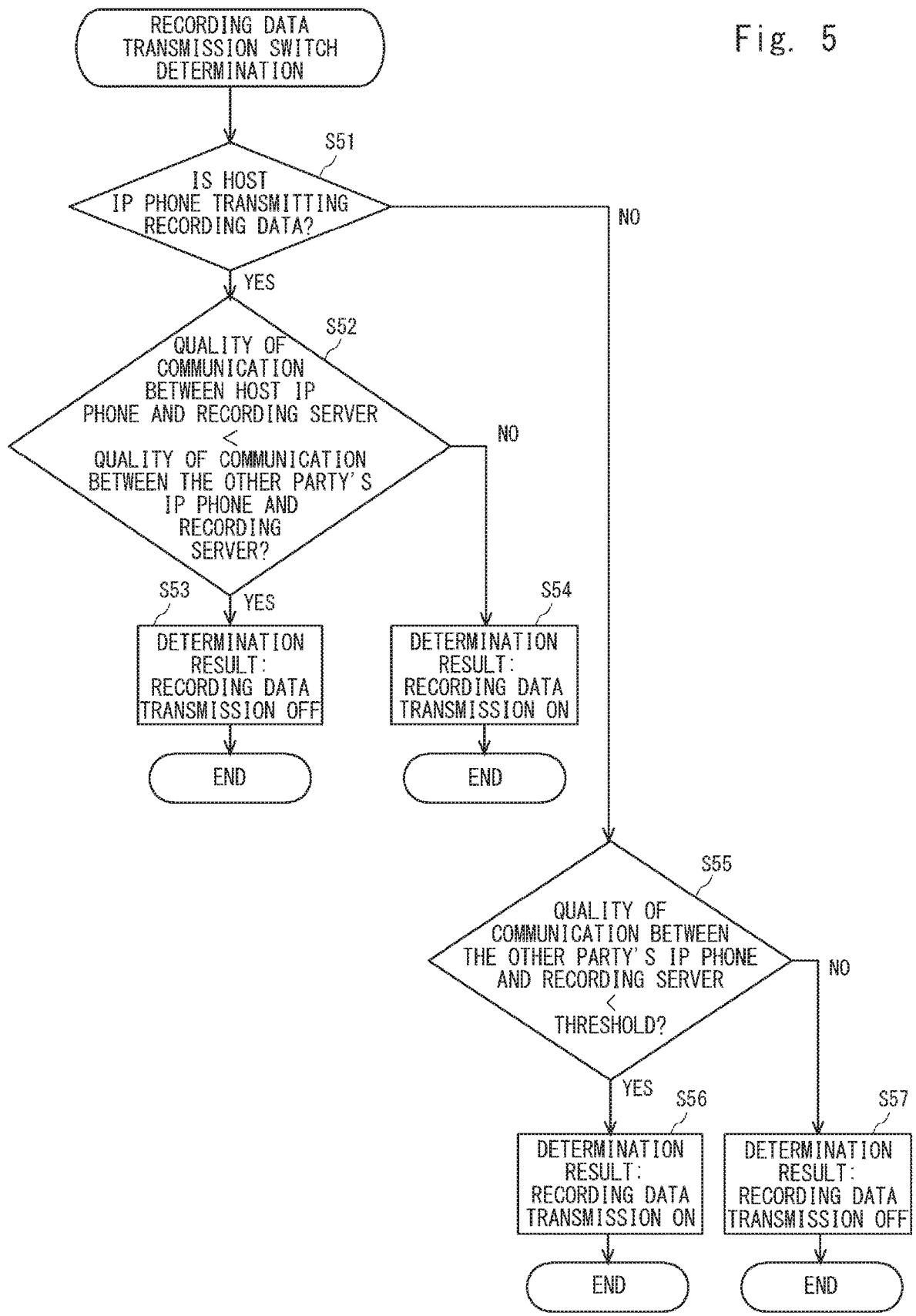
FIG. 5 is a flowchart for describing an example of processing of determining whether the recording data (call audio data) transmitted to the recording server is to be switched, and this determination is made on the basis of a result of comparing communication quality information in the calling IP phone with communication quality information in the called IP phone.

Now, details of switch determination processing of determining whether the IP phone that should transmit the recording data (call audio data) to the recording server 10 is to be switched will be described with reference to the flowchart illustrated in FIG. 5. This determination is made on the basis of a result of comparing the communication quality information 207 of the calling IP phone 20*a* with the communication quality information 207 of the called IP phone 20*b*. FIG. 5 is a flowchart for describing an example of processing of determining whether the recording data (call audio data) transmitted to the recording server is to be switched, and this determination is made on the basis of a result of comparing the communication quality information of the calling IP phone 20*a* and the communication quality information of the called IP phone 20*b*.

In the flowchart illustrated in FIG. 5, first, the host IP phone determines whether the host IP phone is transmitting the recording data (call audio data) to the recording server 10 (step S51). If the host IP phone is transmitting the recording data (YES in step S51), it is then determined whether the communication quality indicated by the received information on the quality of communication between the other party's IP phone and the recording server 10 is higher than the communication quality indicated by the communication quality information 207 between the host IP phone and the recording server 10 stored in the memory 202 (step S52).

If, as a determination result in step S52, the communication quality is higher in the other party's IP phone than in the host IP phone (YES in step S52), as a final determination result, the transmission operation flag instructing the host IP phone to transmit the recording data (call audio data) to the recording server 10 is set to OFF, and the host IP is configured to refrain from transmitting the recording data (call audio data) to the recording server 10 (step S53).

In contrast, if, as a determination result in step S52, the communication quality is not higher in the other party's IP phone than in the host IP phone (NO in step S52), as a final determination result, the transmission operation flag instructing the host IP phone to transmit the recording data (call audio data) to the recording server 10 is set to ON, and the host IP phone is configured to transmit the recording data (call audio data) to the recording server 10 (step S54).

If, as a determination result in step S51, the host IP phone is not transmitting the recording data (NO in step S51), it is then determined whether the communication quality indicated by the received information on the quality of communication between the other party's IP phone and the recording server 10 is lower than a preset threshold (i.e., low quality) (step S55).

If, as a determination result in step S55, the communication quality of the other party's IP phone is lower than the threshold (YES in step S55), as a final determination result, the transmission operation flag instructing the host IP phone to transmit the recording data (call audio data) to the recording server 10 is set to ON (step S56). In other words, in the above case, the operation of transmitting the recording data to the recording server 10 is switched from the other party's IP phone to the host IP phone.

Meanwhile, if, as a determination result in step S55, the communication quality of the other party's IP phone is not lower than the threshold (NO in step S55), as a final determination result, the transmission operation flag instructing the host IP phone to transmit the recording data (call audio data) to the recording server 10 is set to OFF (step S57).

In the foregoing description, if, in step S51, the host IP phone is transmitting the recording data to the recording server 10 (YES in step S51), in step S52, the information on the quality of communication between the other party's IP phone and the recording server 10 sent from the other party's IP phone of the conversing party is referred to immediately. Although not illustrated, however, if the host IP phone is not notified of the information on the quality of communication of the other party's IP phone, determination processing on recording data transmission switching is carried out as described below.

Specifically, it is determined whether the communication quality indicated by the information on the quality of communication between the host IP phone and the recording server 10 is lower than a preset threshold. If the communication quality of the host IP phone is lower than the threshold, as a final determination result, the transmission operation flag instructing the host IP phone to transmit the recording data (call audio data) to the recording server 10 is set to OFF, and the operation of transmitting the recording data from the host IP phone is stopped. In other words, in the above case, the operation of transmitting the recording data to the recording server 10 is switched from the host IP phone to the other party's IP phone. Meanwhile, if the communication quality of the host IP phone is not lower than the threshold, as a final determination result, the transmission operation flag instructing the host IP phone to transmit the recording data (call audio data) to the recording server 10 is kept being ON, and the operation of transmitting the recording data is continued.

Returning to the description of step S26 in the sequence diagram illustrated in FIG. 4, the assumption is as follows. As a determination result of determining whether to switch the transmission of the recording data (call audio data) to the recording server 10, for example, the communication quality indicated by the information on the quality of communication received by the calling IP phone 20a that is not transmitting the recording data from the called IP phone 20b that is transmitting the recording data is lower than a preset threshold. Then, in step S26, the transmission operation flag instructing the calling IP phone 20a to transmit the recording data (call audio data) to the recording server 10 is set to ON. In other words, this causes a shift to an operation in which the IP phone that transmits the recording data (call audio data) to the recording server 10 is switched from the current called IP phone 20b to the calling IP phone 20a.

The calling IP phone 20a in which the transmission operation flag is set to ON establishes a recording session between the calling IP phone 20a and the recording server 10 (step S27). Furthermore, the calling IP phone 20a starts transmitting, to the recording server 10, the call audio data of the calling IP phone 20a transmitted to and received from the called IP phone 20b. The stated call audio data is transmitted as the recording data via the recording session established between the calling IP phone 20a and the recording server 10.

Furthermore, if the calling IP phone 20a has established a recording session between the calling IP phone 20a and the recording server 10, for example, the calling IP phone 20a acquires the route information to the recording server 10 from the calling IP phone 20a by using a traceroute command or the like (step S28) and stores the route information as one piece of the recording server information 206 in the memory 202 (step S29). In addition, the calling IP phone 20a continues to transmit, to the recording server 10, the call audio data of the calling IP phone 20a transmitted to and received from the called IP phone 20b in accordance with a protocol such as the RTP. The stated call audio data is transmitted as the recording data via the recording session established between the calling IP phone 20a and the recording server 10 (step S30).

As long as the recording session is being established between the calling IP phone 20a and the recording server 10, the calling IP phone 20a receives the reception quality information sent, as appropriate, from the recording server 10 in accordance with the RTCP (RTP Control Protocol) protocol in order to check the communication status between the calling IP phone 20a and the recording server 10 (step S31). Then, the calling IP phone 20a stores the received reception quality information into the communication quality information 207 in the memory 202 as information indicating the quality of communication between the calling IP phone 20a and the recording server 10 (step S32). Then, the calling IP phone 20a sends, to the called IP phone 20b, the reception quality information sent from the recording server 10 as information indicating the quality of communication between the calling IP phone 20a and the recording server 10 in accordance with the RTCP protocol (step S33).

Upon receiving the information on the quality of communication between the calling IP phone 20a and the recording server 10 from the calling IP phone 20a, the called IP phone 20b that has been transmitting the recording data (call audio data) to the recording server 10 determines whether to switch the transmission of the recording data (call audio data) to the recording server 10 in accordance with the procedures described in detail with reference to the flowchart illustrated in FIG. 5 (step S34).

If, as a determination result, for example, in the called IP phone 20b that is transmitting the recording data, the communication quality indicated by the communication quality information 207 stored in the memory 202 of the called IP phone 20b is lower than the communication quality indicated by the communication quality information received from the calling IP phone 20a that has started transmitting the recording data (i.e., lower quality), in step S34, the transmission operation flag instructing the called IP phone 20b to transmit the recording data (call audio data) to the recording server 10 is set to OFF.

As a result, the called IP phone 20b terminates (disconnects) the recording session between the called IP phone 20b and the recording server 10 and stops transmitting the recording data (call audio data) to the recording server 10 (step S35). In other words, this completes the operation in which the IP phone that transmits the recording data (call audio data) to the recording server 10 is switched from the current called IP phone 20b to the calling IP phone 20a.

As described above, even while two IP phones each configured to make a recording—for example, the calling IP phone 20a and the called IP phone 20b—are engaging in a voice call, an operation of comparing the communication qualities of the two IP phones as appropriate makes it possible to switch the IP phone that transmits the recording data (call audio data) to the recording server 10 to the IP phone with a higher quality of communication with the recording server 10 (e.g., the calling IP phone 20a in the foregoing description). Thus, call audio data with a higher quality can be transmitted to and stored in the recording server 10. In this manner, the call recording data with a higher communication quality stored in the recording server 10 can be played back by either one of the two IP phones, that is, by either one of the calling IP phone 20a and the called IP phone 20b regardless of the transmitter of the call recording data. Whether the played-back call data has been transmitted from the calling IP phone 20a or from the called IP phone 20b can be found from phone information included and stored in the recording data.

(Description of Advantageous Effects of Embodiments)

As described above in detail, in the present embodiment, the information on the quality of communication with the recording server 10 is exchanged between the IP phone 20a and the IP phone 20b engaging in a call to determine whether the recording data can be transmitted (or is not to be transmitted) to the recording server 10. Thus, the IP phone that transmits the recording data (call audio data) to the recording server 10 is set to one of the IP phone 20a and the IP phone 20b. Accordingly, the recording data (call audio data) can be kept from being transmitted in duplicate to the recording server 10. Hence, the communication traffic in an IP network constituting the call recording system can be reduced, and the storage capacity of the recording server 10 can be prevented from being wasted.

Other Embodiments

In the case described in the foregoing embodiment, a mechanism is provided in which it is determined whether each of the two IP phones can transmit (is to refrain from transmitting) the call audio data to the recording server as the two IP phones (e.g., the calling IP phone 20a and the called IP phone 20b) exchange information on the quality of communication between each IP phone and the recording server 10 at the start of a call and while the two IP phones are engaging in a call. The present invention, however, is not limited to such a case. In the other embodiments as well, similar to the case of the foregoing embodiment, the call recording data stored in the recording server 10 can be played back by either one of the two IP phone, that is, by either one of the calling IP phone 20a and the called IP phone 20b regardless of the transmitter of the call recording data.

Another First Embodiment

For example, as another first embodiment, a mechanism may be provided in which it is determined whether each of the two IP phone can transmit (is to refrain from transmitting) the call audio data (recording data) to the recording server 10 as the two IP phones (e.g., the calling IP phone 20a and the called IP phone 20b) exchange information on the time at which a request for recording the call audio data (recording data) has been transmitted to the recording server 10 at the start of the call. Specifically, the two IP phones exchange information on the transmission time at which a recording session establishing request for recording the call audio data (recording data) has been transmitted to the recording server 10.

Then, the IP phone that has transmitted the recording session establishing request earlier may establish a recording session and transmit the call audio data (recording data) to the recording server 10, and the IP phone that has transmitted the recording session establishing request later may invalidate the recording session establishing request to release the recording session. After the recording session has been established, similar to the foregoing embodiment, for example, it may be determined whether the IP phone that transmits the call audio data (recording data) should be switched to the IP phone of the conversing party on the basis of the information on the quality of communication between the IP phones and the recording server 10, and the recording session with the recording server 10 may be switched.

Another Second Embodiment

Alternatively, as another second embodiment, the IP phone may transmit, to the recording server 10, a recording session establishing request that includes information on the conversing party of the IP phone, and the recording server 10 may check whether the recording session establishing request has already been received from the conversing party. Then, the recording server 10 may refer to the information on the conversing party included in the recording session establishing request, upon receiving the recording session establishing request. If the recording server 10 has not received the recording session establishing request from the conversing party, the recording server 10 may establish a recording session with the IP phone. Meanwhile, if the recording server 10 has already received the recording session establishing request from the conversing party, the recording server 10 may refrain from establishing a recording session with the IP phone.

In other words, in order to establish a recording session with the recording server 10 for recording the call audio data, the IP phone transmits, to the recording server 10, the recording session establishing request that includes at least phone information for identifying the host IP phone and the IP phone of the conversing party. Thus, the recording server 10 that has received the recording session establishing request from the IP phone refers to the phone information for identifying the IP phone of the conversing party included in the recording session establishing request and checks whether the recording session establishing request has already been received from the IP phone of the conversing party.

If the recording session establishing request has not been received from the IP phone of the conversing party, the recording server 10 establishes a recording session with the IP phone that is the transmitter of the recording session establishing request received this time and stores the call audio data transmitted from the stated IP phone as the recording data thereafter. Meanwhile, if the recording session establishing request has already been received from the IP phone of the conversing party, the recording server 10 refuses the recording session establishing request received this time and refrains from establishing a recording session with the IP phone that is the transmitter in this instance. After the recording session has been established, similar to the foregoing embodiment, it may be determined whether the IP phone that transmits the call audio data (recording data) should be switched to the IP phone of the conversing party on the basis of the information on the quality of communication between the IP phones and the recording server 10, and the recording session with the recording server 10 may be switched.

Another Third Embodiment

Alternatively, as another third embodiment, when IP phones (IP phone A and IP phone B) each configured to make a recording engage in a voice call, each of the IP phones may transmit the call audio data (recording data) to the recording server 10, and the recording server 10 may record the call audio data (recording data) received first and discard the call audio data (recording data) received later. In the case of such an operation, the same call audio data (recording data) is transmitted in duplicate over the IP network 30, and the communication traffic is not reduced. However, necessary call audio data (recording data) can be stored reliably in the recording server 10, and the storage capacity of the recording server 10 can be prevented from being wasted.

Figure 6:
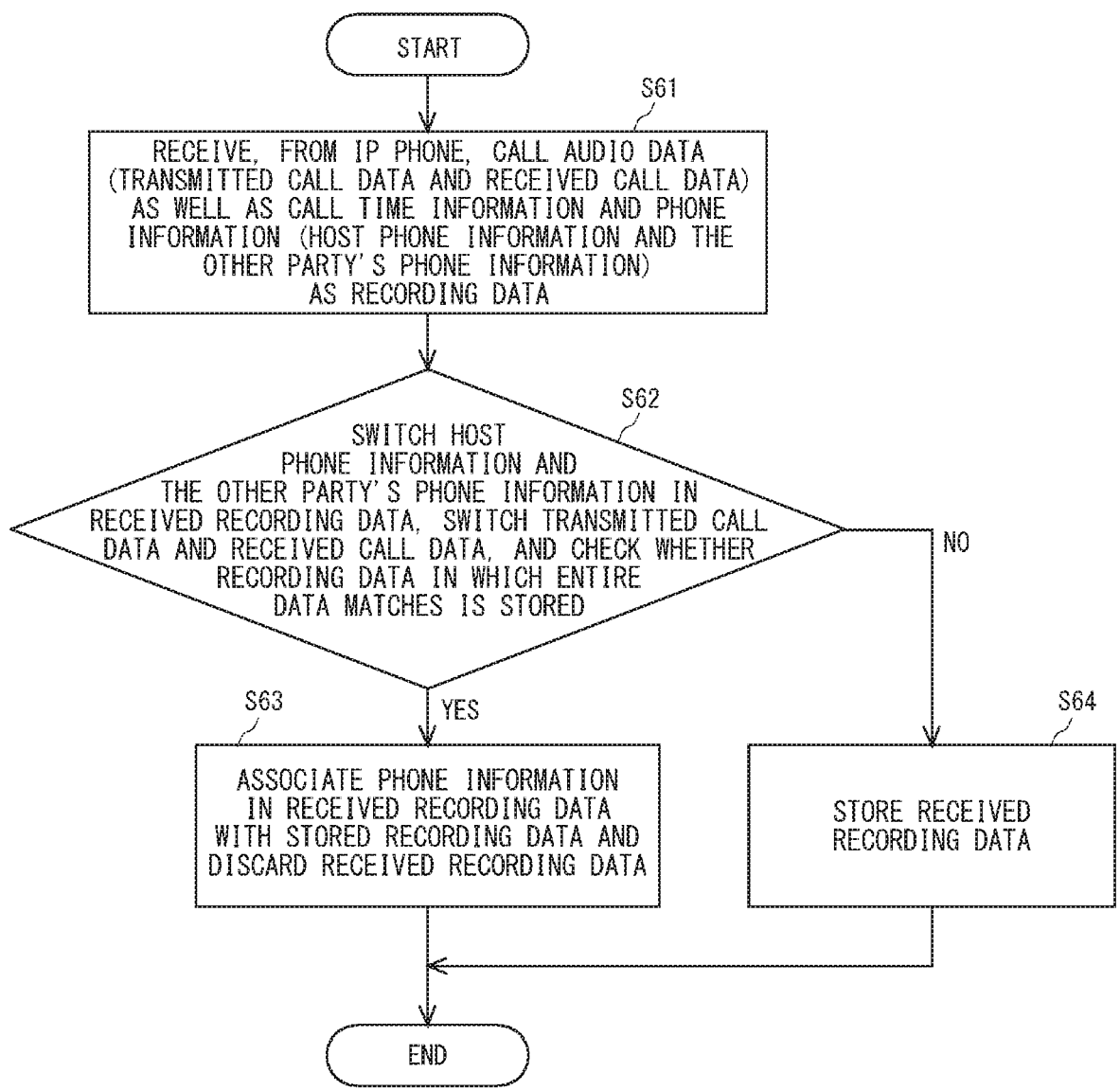
FIG. 6 is a flowchart for describing an example of processing carried out in the recording server in order to prevent the recording data from being stored in duplicate according to another embodiment.

FIG. 6 is a flowchart for describing an example of processing in the recording server 10 for preventing the recording data from being stored in duplicate according to another embodiment. FIG. 6 illustrates an example of processing of storing the recording data (call audio data:

transmitted call data and received call data) received first and discarding the recording data (call audio data: transmitted call data and received call data) received later, as described earlier. In the present embodiment, in order to allow the recording server 10 to check whether the recording data is present in duplicate, the recording data transmitted to the recording server 10 further includes at least data on phone information (host phone information and the other party's phone information) and call time information (call start time and call end time), in addition to the call audio data (transmitted call data and received call data). The phone information (host phone information and the other party's phone information) is unique information that allows each IP phone to be identified and is, for example, information such as the phone number or the IP address. Depending on the case, it suffices that at least the phone information (host phone information and the other party's phone information) be included as the additional data.

In the flowchart illustrated in FIG. 6, the recording server 10 receives, from either of the two IP phones engaging in a call, the call audio data (transmitted call data and received call data) as well as the call time information and the phone information as the recording data (step S61) and switches the host phone information and the other party's phone information in the phone information included in the received recording data. Then, on the basis of a result of this switch, the recording server 10 checks whether the recording data in which the entire data added to the call audio data matches is already stored (step S62). Furthermore, the recording server 10 may also switch the transmitted call data and the received call data in the call audio data and check whether the recording data in which the entire data in the recording data matches is already stored, including the call audio data aside from the added data.

If matching recording data is not stored (NO in step S62), this means that the received recording data is new recording data that is not a duplicate of the received recording data, and thus the recording server 10 stores this recording data (step S64). Meanwhile, if the recording data in which the entire data matches is stored already (YES in step S62), if the recording data in which the entire data matches is stored already (YES in step S62), the phone information (host phone information and the other party's phone information) included in the recording data received this time is associated with the stored recording data, and the recording data received this time is discarded in order to prevent the recording data from being stored in duplicate (step S63).

Figure 7:
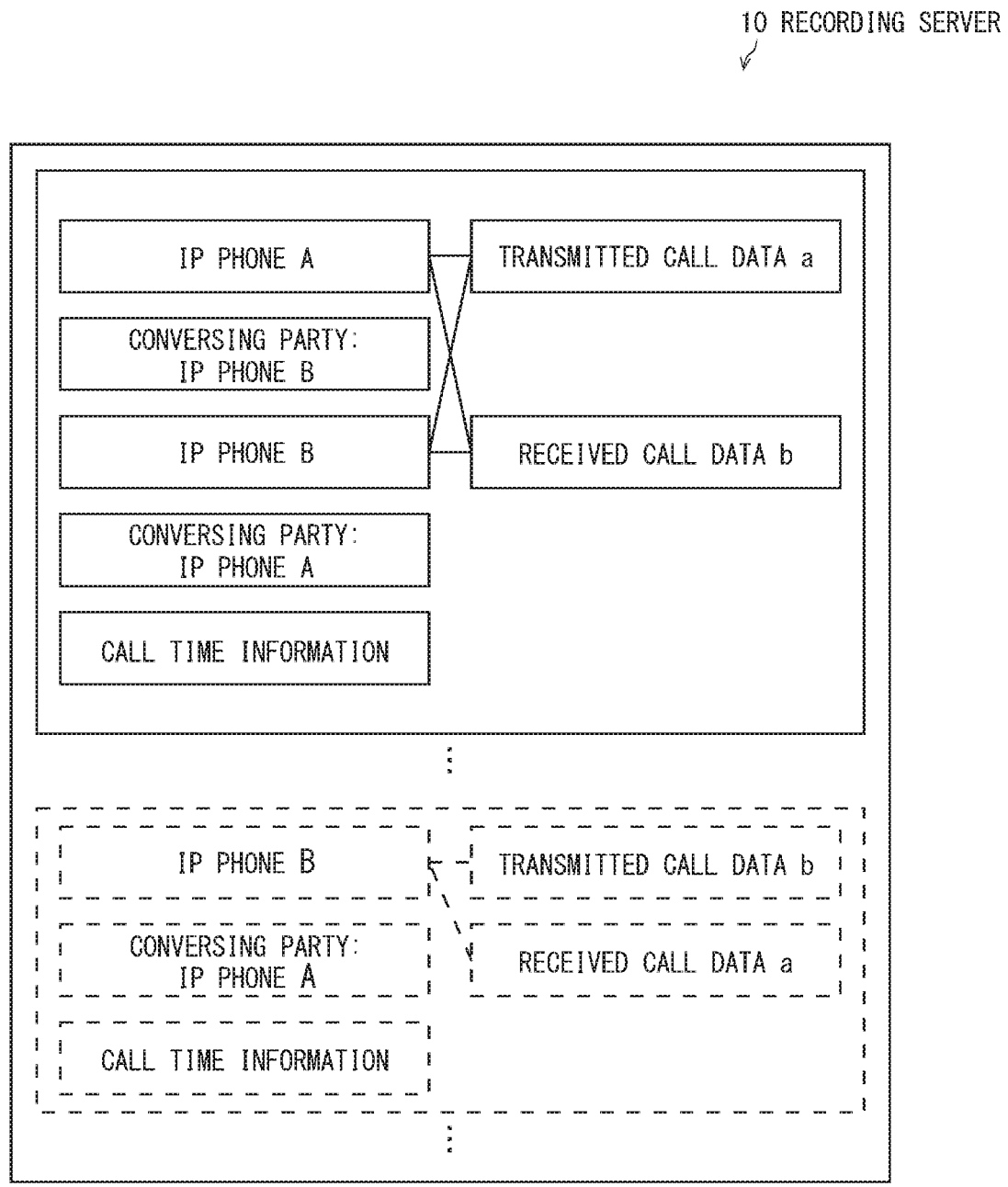
FIG. 7 is a schematic diagram for describing how phone information is associated in step S63 of a flowchart illustrated in FIG. 6.
Figure 8:
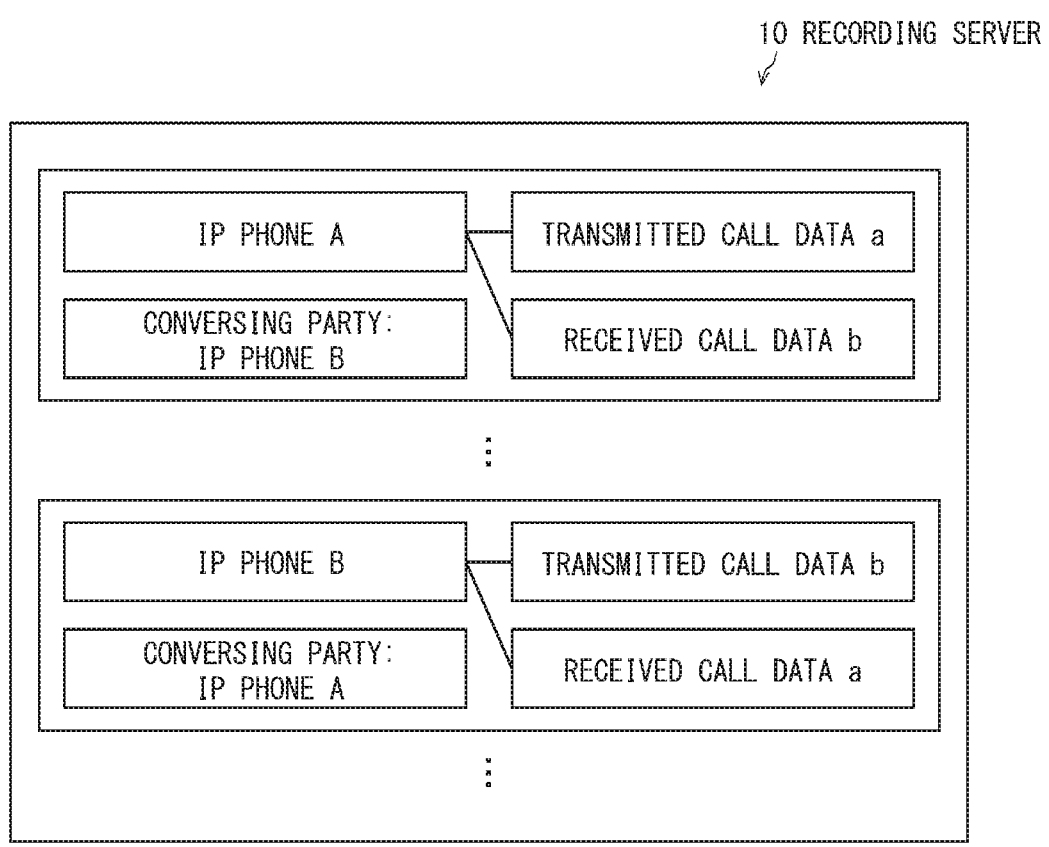
FIG. 8 is a schematic diagram for describing a state in which the same call audio data is recorded in duplicate in a recording server according to current technology.

FIG. 7 is a schematic diagram for describing how the phone information is associated in step S63 of the flowchart illustrated in FIG. 6. FIG. 7 illustrates how the phone information (host phone information and the other party's phone information) included in the recording data received this time is associated with the stored recording data. In the schematic diagram illustrated in FIG. 7, the recording server 10 stores, as the recording data of the IP phone A, the transmitted call data a transmitted by the host IP phone A and the received call data b received from the IP phone B of the conversing party along with the IP phone A serving as the host phone information and the IP phone B serving as the other party's phone information in the phone information and the call time information.

While the recording server 10 is in such a storage state, as indicated by the dotted line in the schematic diagram illustrated in FIG. 7, the IP phone B of the conversing party of the IP phone A transmits, as the recording data of the IP phone B, the transmitted call data b transmitted by the host IP phone B and the received call data a received from the IP phone A of the conversing party along with the IP phone B serving as the host phone information and the IP phone A serving as the other party's phone information in the phone information and the call time information. Through the processing in step S62 of the flowchart illustrated in FIG. 6, the IP phone B serving as the host phone information and the IP phone A serving as the other party's phone information in the phone information in the recording data received from the IP phone B are switched in the recording server 10, which results in the IP phone A serving as the host phone information and the IP phone B serving as the other party's phone information. (Furthermore, the transmitted call data b and the received call data a in the call audio data are switched, which results in the transmitted call data a and the received call data b.)

Accordingly, the recording server 10 can find that the same data as the recording data of the IP phone B is already stored as the recording data of the IP phone A. Thus, as indicated by crossing line segments in the schematic diagram illustrated in FIG. 7, the phone information (host phone information and the other party's phone information) in the recording data transmitted this time from the IP phone B is associated with the transmitted call data a and the received call data b of the stored recording data of the IP phone A such that the transmitted call data a becomes the received call data a and the received call data b becomes the transmitted call data b. Thereafter, as indicated by dashed lines in the schematic diagram illustrated in FIG. 7, the recording server 10 discards the recording data transmitted this time from the IP phone B.

Through the operation in the recording server 10 as exemplified in the flowchart illustrated in FIG. 6, although the same recording data is transmitted in duplicate as the communication traffic over the IP network 30, necessary recording data can be stored reliably in the recording server 10, and the same recording data can be prevented from being stored in duplicate. Accordingly, the recording server 10 can store more recording data (call audio data) for an extended period.

Thus far, configurations of preferred embodiments of the present invention have been described. However, it is to be noted that these embodiments are merely illustrative examples of the present invention and are not intended to limit the present invention in any way. It should be easily appreciated by a person skilled in the art that various modifications and changes can be made in accordance with the specific intended use without departing from the spirit of the present invention.

Supplementary Note 1

A call recording system configured to transmit, over an IP network, call audio data from IP phones engaging in a voice call to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

Supplementary Note 2

A call recording system configured to transmit, over an IP network, call audio data from IP phones engaging in a voice call to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter.

Supplementary Note 3

A call recording system configured to transmit, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, and if the recording data is already stored, the recording server associates the phone information included in the recording data received from the IP phone with the stored recording data and discards the recording data received from the IP phone.

Supplementary Note 4

The call recording system according to any one of Supplementary Notes 1 to 3, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

Supplementary Note 5

The call recording system according to any one of Supplementary Notes 1 to 3, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

Supplementary Note 6

The call recording system according to Supplementary Note 4, wherein the IP phone is configured to, if the recording session is not being established, upon receiving information on the quality of communication between the IP phone of the conversing party and the recording server from the IP phone of the conversing party, compare the received quality of communication between the IP phone of the conversing party and the recording server with a preset threshold, if the received quality of communication between the IP phone of the conversing party and the recording server is lower than the threshold, carry out an operation of establishing a recording session with the recording server in order to switch to a state in which the recording data is transmitted to the recording server from the host IP phone, and if the received quality of communication between the IP phone of the conversing party and the recording server is no lower than the threshold, continue with a state in which an operation of transmitting the recording data to the recording server from the host IP phone is being stopped.

Supplementary Note 7

A call recording method of transmitting, over an IP network, call audio data from IP phones engaging in a voice call to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

Supplementary Note 8

A call recording method of transmitting, over an IP network, call audio data from IP phones engaging in a voice call to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter.

Supplementary Note 9

A call recording method of transmitting, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, and if the recording data is already stored, the recording server associates the phone information included in the recording data received from the IP phone with the stored recording data and discards the recording data received from the IP phone.

Supplementary Note 10

The call recording method according to any one of Supplementary Notes 7 to 9, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

Supplementary Note 11

The call recording method according to any one of Supplementary Notes 7 to 9, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

Supplementary Note 12

The call recording method according to Supplementary Note 10, wherein the IP phone is configured to, if the recording session is not being established, upon receiving information on the quality of communication between the IP phone of the conversing party and the recording server from the IP phone of the conversing party, compare the received quality of communication between the IP phone of the conversing party and the recording server with a preset threshold, if the received quality of communication between the IP phone of the conversing party and the recording server is lower than the threshold, carry out an operation of establishing a recording session with the recording server in order to switch to a state in which the recording data is transmitted to the recording server from the host IP phone, and if the received quality of communication between the IP phone of the conversing party and the recording server is no lower than the threshold, continue with a state in which an operation of transmitting the recording data to the recording server from the host IP phone is being stopped.

Supplementary Note 13

A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

Supplementary Note 14

A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter.

Supplementary Note 15

A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, and if the recording data is already stored, the recording server associates the phone information included in the recording data received from the IP phone with the stored recording data and discards the recording data received from the IP phone.

Supplementary Note 16

The non-transitory computer-readable medium storing a call recording program according to any one of Supplementary Notes 13 to 15, wherein
the IP phone is configured to,
upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party,
if information on the quality of communication between the IP phone of the conversing party and the recording server has been received from the IP phone of the conversing party, compare the quality of communication between the host IP phone and the recording server with the quality of communication between the IP phone of the conversing party and the recording server,
if the quality of communication of the host IP phone is higher than the quality of communication of the IP phone of the conversing party, continue with an operation of transmitting the call audio data to the recording server as the recording data, and
if the quality of communication of the host IP phone is lower than the quality of communication of the IP phone of the conversing party, stop an operation of transmitting the call audio data to the recording server.

Supplementary Note 17

The non-transitory computer-readable medium storing a call recording program according to any one of Supplementary Notes 13 to 15, wherein
the IP phone is configured to,
upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party,
if information on the quality of communication between the IP phone of the conversing party and the recording server has not been received from the IP phone of the conversing party, compare the quality of communication between the host IP phone and the recording server with a preset threshold,
if the quality of communication between the host IP phone and the recording server is no lower than the threshold, continue with an operation of transmitting the call audio data to the recording server as the recording data, and
if the quality of communication between the host IP phone and the recording server is lower than the threshold, stop an operation of transmitting the call audio data to the recording server.

Supplementary Note 18

The non-transitory computer-readable medium storing a call recording program according to Supplementary Note 16, wherein
the IP phone is configured to,
if the recording session is not being established, upon receiving information on the quality of communication between the IP phone of the conversing party and the recording server from the IP phone of the conversing party, compare the received quality of communication between the IP phone of the conversing party and the recording server with a preset threshold,
if the received quality of communication between the IP phone of the conversing party and the recording server is lower than the threshold, carry out an operation of establishing a recording session with the recording server in order to switch to a state in which the recording data is transmitted to the recording server from the host IP phone, and
if the received quality of communication between the IP phone of the conversing party and the recording server is no lower than the threshold, continue with a state in which an operation of transmitting the recording data to the recording server from the host IP phone is being stopped.

INDUSTRIAL APPLICABILITY

The present invention can be used in a call made over an IP network.

REFERENCE SIGNS LIST 10 recording server
20a IP phone (calling IP phone)
20b IP phone (called IP phone)
30 IP network
201 control unit
202 memory
203 communication interface
204 recording data transmission start determination processing unit
205 recording data transmission switch determination processing unit
206 recording server information
207 communication quality information

The invention claimed is:
1. A call recording system configured to transmit, over an IP network, call audio data from IP phones engaging in a voice call to a recording server as recording data so that the call audio data is recorded in the recording server, wherein
when a call session is set between the IP phones of conversing parties at a start of a call, the IP phones exchange information on a quality of communication between a host IP phone and the recording server to compare the quality of communication of the IP phones,
if the quality of communication of the host IP phone is higher than the quality of communication of the IP phone of a conversing party, the host IP phone is configured to transmit the call audio data to the recording server as the recording data, and
if the quality of communication of the host IP phone is lower than the quality of communication of the IP phone of the conversing party, the host IP phone is configured to refrain from transmitting the call audio data to the recording server.
2. A call recording system configured to transmit, over an IP network, call audio data from IP phones engaging in a voice call to a recording server as recording data so that the call audio data is recorded in the recording server, wherein
in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, if the recording session establishing request has already been received from the IP phone of the conversing party, the recording server refuses the received recording session establishing request and refrains from establishing a recording session with the IP phone that is the transmitter, if the difference between a first quality of communication between the host IP phone and the recording server and a second quality of communication between the IP phone and the recording server is within a predetermined quality, a first route information between the host IP phone and the recording server is compared with a second route information between the IP phone and the recording server, if a second route between the IP phone and the recording server is shorter than a first route between the host IP phone and the recording sever, operation of transmitting recording data the host IP phone to the recording server is stopped, and if the first route is shorter than the second route, the operation of transmitting the recording data from the host IP phone to the recording server is performed.

3. The call recording system according to claim 2, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

4. The call recording system according to claim 2, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

5. The call recording system according to claim 3, wherein the IP phone is configured to, if the recording session is not being established, upon receiving information on the quality of communication between the IP phone of the conversing party and the recording server from the IP phone of the conversing party, compare the received quality of communication between the IP phone of the conversing party and the recording server with a preset threshold, if the received quality of communication between the IP phone of the conversing party and the recording server is lower than the threshold, carry out an operation of establishing a recording session with the recording server in order to switch to a state in which the recording data is transmitted to the recording server from the host IP phone, and if the received quality of communication between the IP phone of the conversing party and the recording server is no lower than the threshold, continue with a state in which an operation of transmitting the recording data to the recording server from the host IP phone is being stopped.

6. A call recording system configured to transmit, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, if the recording data is already stored, the recording server associates the phone information included in the recording data received from the IP phone with the stored recording data and discards the recording data received from the IP phone, if the difference between a first quality of communication between the host IP phone and the recording server and a second quality of communication between the IP phone and the recording server is within a predetermined quality, a first route information between the host IP phone and the recording server is compared with a second route information between the IP phone and the recording server, if a second route between the IP phone and the recording server is shorter than a first route between the host IP phone and the recording server, operation of transmitting recording data from the host IP phone to the recording server is stopped, and if the first route is shorter than the second route, the operation of transmitting the recording data from the host IP phone to the recording server is performed.

7. The call recording system according to claim 6, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

8. The call recording system according to claim 7, wherein the IP phone is configured to, if the recording session is not being established, upon receiving information on the quality of communication between the IP phone of the conversing party and the recording server from the IP phone of the conversing party, compare the received quality of communication between the IP phone of the conversing party and the recording server with a preset threshold, if the received quality of communication between the IP phone of the conversing party and the recording server is lower than the threshold, carry out an operation of establishing a recording session with the recording server in order to switch to a state in which the recording data is transmitted to the recording server from the host IP phone, and if the received quality of communication between the IP phone of the conversing party and the recording server is no lower than the threshold, continue with a state in which an operation of transmitting the recording data to the recording server from the host IP phone is being stopped.

9. The call recording system according to claim 6, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

10. A call recording method of transmitting, over an IP network, call audio data from IP phones engaging in a voice call to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

11. A call recording method of transmitting, over an IP network, call audio data from IP phones engaging in a voice call to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, if the recording session establishing request has already been received from the IP phone of the conversing party, the recording server refuses the received recording session establishing request and refrains from establishing a recording session with the IP phone that is the transmitter, if the difference between a first quality of communication between the host IP phone and the recording server and a quality of communication between the IP phone and the recording server is within a predetermined quality, a first route information between the host IP phone and the recording server is compared with a second route onformation between the IP phone and the recording server, if a second between the IP phone and the recording server is shorter than a first route between the host IP phone and the recording server, operation of transmitting recording data from the host IP phone to the recording server is stopped, and if the first route is shorter than the second route, the operation of transmitting the recording data from the host IP phone to the recording server is performed.

12. The call recording method according to claim 11, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

13. The call recording method according to claim 12, wherein the IP phone is configured to, if the recording session is not being established, upon receiving information on the quality of communication between the IP phone of the conversing party and the recording server from the IP phone of the conversing party, compare the received quality of communication between the IP phone of the conversing party and the recording server with a preset threshold, if the received quality of communication between the IP phone of the conversing party and the recording server is lower than the threshold, carry out an operation of establishing a recording session with the recording server in order to switch to a state in which the recording data is transmitted to the recording server from the host IP phone, and if the received quality of communication between the IP phone of the conversing party and the recording server is no lower than the threshold, continue with a state in which an operation of transmitting the recording data to the recording server from the host IP phone is being stopped.

14. The call recording method according to claim 11, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

15. A call recording method of transmitting, over an IP network, call audio data from IP phones engaging in a voice call to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, if the recording data is already stored, the recording server associates the phone information included in the recording data received from the IP phone with the stored recording data and discards the recording data received from the IP phone, if the difference between a first quality of communication between the host IP phone and the recording server and a second quality of communication between the IP phone and the recording server is within a predetermined quality, a first route information between the host IP phone and the recording server is compared with a second route information between the IP phone and the recording server, if a second route between the IP phone and the recording server is shorter than a first route between the host IP phone and the recording server, operation of transmitting recording data from the host IP phone to the recording server is stopped, and if the first route is shorter than the second route, the operation of transmitting the recording data from the host IP phone to the recording server is performed.

16. A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein when a call session is set between the IP phones of conversing parties at a start of a call, the IP phones exchange information on a quality of communication between a host IP phone and the recording server to compare the quality of communication of the IP phones, if the quality of communication of the host IP phone is higher than the quality of communication of the IP phone of a conversing party, the host IP phone is configured to transmit the call audio data to the recording server as the recording data, and if the quality of communication of the host IP phone is lower than the quality of communication of the IP phone of the conversing party, the host IP phone is configured to refrain from transmitting the call audio data to the recording server.

17. The non-transitory computer-readable medium storing a call recording program according to claim 16, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has been received from the IP phone of the conversing party, compare the quality of communication between the host IP phone and the recording server with the quality of communication between the IP phone of the conversing party and the recording server, if the quality of communication of the host IP phone is higher than the quality of communication of the IP phone of the conversing party, continue with an operation of transmitting the call audio data to the recording server as the recording data, and if the quality of communication of the host IP phone is lower than the quality of communication of the IP phone of the conversing party, stop an operation of transmitting the call audio data to the recording server.

18. The non-transitory computer-readable medium storing a call recording program according to claim 16, wherein the IP phone is configured to, upon receiving, from the recording server with which the recording session is being established, reception quality information transmitted as appropriate as information indicating a reception quality of the recording data transmitted by the IP phone, store the reception quality information as information on a quality of communication between the host IP phone and the recording server and transmit the reception quality information to the IP phone of the conversing party, if information on the quality of communication between the IP phone of the conversing party and the recording server has not been received from the IP phone of the conversing party, compare the quality of communication between the host IP phone and the recording server with a preset threshold, if the quality of communication between the host IP phone and the recording server is no lower than the threshold, continue with an operation of transmitting the call audio data to the recording server as the recording data, and if the quality of communication between the host IP phone and the recording server is lower than the threshold, stop an operation of transmitting the call audio data to the recording server.

19. A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein in order to establish a recording session between the IP phone and the recording server for recording the call audio data, the IP phone transmits, to the recording server, a recording session establishing request that includes at least phone information for identifying a host IP phone and the IP phone of a conversing party, the recording server that has received the recording session establishing request from the IP phone checks whether the recording session establishing request has already been received from the IP phone of the conversing party by referring to the phone information for identifying the IP phone of the conversing party included in the recording session establishing request, if the recording session establishing request has not been received from the IP phone of the conversing party, the recording server establishes a recording session with the IP phone that is a transmitter of the received recording session establishing request and makes a setting so as to store the call audio data transmitted from the IP phone as the recording data thereafter, and if the recording session establishing request has already been received from the IP phone of the conversing party, the recording server refuses the received recording session establishing request and refrains from establishing a recording session with the IP phone that is the transmitter, if the difference between a first quality of communication between the host IP phone and the recording server and a second quality of communication between the IP phone and the recording server is within a predetermined quality, a first route information between the host IP phone and the recording server is compared with a second route information between the IP phone and the recording server, if a second route between the IP phone the recording server is shorter than a first route between the host IP phone and the recording server, operation of transmitting recording data from the host IP phone to the recording server is stopped, and if the first route is shorter than the second route, the operation of transmitting the recording data from the host IP phone to the recording server is performed.

20. A non-transitory computer-readable medium storing a call recording program that can cause a computer provided in IP phones engaging in a voice call to execute an operation of transmitting, over an IP network, call audio data from the IP phones to a recording server as recording data so that the call audio data is recorded in the recording server, wherein the IP phone that has established a recording session for recording the call audio data in the recording server transmits, to the recording server, data that includes at least the call audio data and phone information for identifying a host IP phone and the IP phone of a conversing party as the recording data, upon receiving the recording data from the IP phone, the recording server checks whether recording data in which information for identifying the host IP phone and information for identifying the IP phone of the conversing party in the phone information included in the recording data are switched is already stored, if the recording data is not stored, the recording server stores the recording data received from the IP phone, if the recording data is already stored, the recording server associates the phone information included in the recording data received from the IP phone with the stored recording data and discards the recording data received from the IP phone, if the difference between a first quality of communication between the host IP phone and the recording server and a second quality of communication between the IP phone and the recording server is within a predetermined quality, a first route information between the host IP phone and the recording server is compared with a second route information between the IP phone and the recording server, if a second route between the IP phone and the recording server is shorter than a first route between the host IP phone and the recording server, operation of transmitting recording data from the host IP phone to the recording server is stopped, and if the first route is shorter than the second route, the operation of transmitting the recording data from the host IP phone to the recording server is performed.

* * * * *